United States Patent Office 2,951,761
Patented Sept. 6, 1960

2,951,761

FISH BAIT

John Thomas Stephan, 2425 West View Drive, Seattle, Wash.

No Drawing. Continuation of application Ser. No. 467,897, Nov. 9, 1954. This application May 19, 1958, Ser. No. 735,951

19 Claims. (Cl. 99—3)

This invention relates to the swelling and hardening of fish eggs and to an improved fish bait made from fish eggs. Particularly this improvement in fish bait has to do with a process for treating fish eggs whereby the individual eggs are separated from the albuminous serum, treated with a weak solution of an aldehyde or other hardening agent, at an elevated temperature to harden and insolubilize the protein, soaked in a weak solution of an acid to further harden the protein, allowed to swell to a predetermined size in fresh water, drained, and preserved by sealing in a hermetically sealed container.

Fish eggs have been recognized as superior fish bait for a long time. The female fish normally lays vast quantities of eggs only a few of which are hatched. The majority of the eggs are eaten by predator fish which may oddly enough include the parent fish. Thus fish eggs and the eggs of other marine life are seen to be a normal food for fish. It is important in a fish bait to have a bait on which the fish are accustomed to feed. Fish eggs as they are removed from the fish vary in size with the specie and the variety within the specie. Heretofore eggs which have been useful as fish bait have had to be large enough to be put onto a hook. Obviously a great variety of fish eggs have heretofore not been satisfatcory for fish bait because the eggs are too small. Furthermore, it is well known that it takes a large hook to catch a large fish. It takes a large egg to cover and conceal a large hook. Obviously there is a great demand for the larger fish eggs and eggs from certain varieties of salmon command a premium price on the market because of their larger size.

My invention is an improved fish egg which is enlarged by swelling in the presence of certain chemicals to a size between 125% and 400% of the original volume.

In carrying out my invention it is convenient to use salmon eggs. Along the west coast of North America extensive fishing is done for salmon and quantities of salmon eggs are available for processing. By salmon I mean a specie of fish known as Onchorhynchus. The Chinook or king salmon is *Onchorynchus tshawytscha*, the chum or dog salmon is *Onchorynchus keta*, the coho or silver salmon is *Onchorynchus kisutch*, the sockeye salmon is *Onchorynchus nerka*, and the pink or humpback salmon is *Onchroynchus gorbuscka*. The largest size eggs are found in the king salmon and are approximately 7 mm. in diameter. The size of the eggs decreases in the following order, chum, silver, pink and sockeye. The sockeye having an approximate diameter of 5 mm. Eggs from other fish such as the halibut, sturgeon, cod, or any variety of salt water or fresh water fish may be used depending on the end use to which the bait is to be put.

The fish eggs and the albuminous sera surrounding them are separated from any other residue from the preparation of the salmon for canning. These eggs may be placed in sodium chloride solution to preserve them. The untreated eggs may be conveniently treated in saturated brine, drained, and stored in wooden kegs until ready for processing.

Storing under refrigeration at 40 to 45° F. is also beneficial in keeping untreated eggs. The untreated salmon egg is somewhat variable in size and roughly spherical in shape, the main dimension being about 5 mm. The eggs do not have any shell and are soft and elastic about the consistency of the yolk of a hen's egg. The untreated fish eggs are largely all protein and consist of 3 main parts, the skin which is the protective outer layer, the interior which corresponds to the egg white in a hen's egg, and an oil sac which rests against the skin. The oil sac is a small proteinous membrane surrounding a small quantity of oil. The eggs as they are obtained from the cannery are surrounded by a more or less gelatinous proteinous serum and preferably are separated from this serum before treating in my process. A convenient method of separating the eggs from the serum is to slurry the raw untreated eggs in water or in a salt solution together with a small amount of any of the well known protein hardening agents and gently heating the slurry for a sufficiently long time and at a temperature sufficiently high to coagulate the albuminous serum.

Protein hardening agents which are useful are those which gel aqueous protein solutions. My preferred hardening agents are aldehydes or dialdehydes such as formaldehyde, acetaldehyde, glyoxal, benzaldehyde, and the like. Reactions which liberate an aldehyde may be used. Hexamethylene tetramine, paraformaldehyde, aldehyde-amino condensation products such as condensation products of an aldehyde with melamine, dicyandiamide, urethane, urea, formamide, acetamide, and the like may be used. Aldehyde-phenol condensation products such condensation products of an aldehyde with phenol, cresol, xylenol, resorcinol, hydroquinone, phenol sulfonic acid, and the like may be used. Omega sulfonation products formed by reacting a phenol, an aldehyde, and a sulfite may also be used advantageously.

Tanning agents including the natural tannins, syntans, aluminum acetate, aluminum formate, aluminum sulfate, chrome alum, and others may be used.

The amount of hardening agent which must be used depends upon the heat treatment. Both the reaction of the protein with hardening agent and the heat treatment harden the egg protein. The effects are additive and may be used interchangeably. A small amount of hardening agent with a long treatment at a high temperature is the equivalent of a large amount of hardening agent and a short treatment at a lower temperature. The concentration of sodium chloride in the brine used in the hardening agent plus heat treatment has an important effect. The higher the concentration of salt the greater is the hardening effect on the egg protein during the heat treatment. It is not always necessary to use salt in conjunction with the heat treatment since tap water may be used.

While I prefer to use sodium chloride because of its cheapness, it is obvious that other salts may be used such as potassium chloride, sodium sulfate, sodium bromide, calcium chloride, and the like.

When other hardening agents are used, usually not more than 1# of hardening agent per 100# of water or brine is required. I prefer to use an aldehyde and depending on the egg specie and variety the amount of aldehyde which is used to harden egg protein may vary between 0.5 and 30 ounces of 37% formaldehyde solution or equivalent per 100 gallons of brine. 150# of salmon eggs are conveniently treated in 100 gallons of brine, however, it is only necessary to have sufficient solution present to hold the egg conveniently in suspension. It is desirable that in carrying out the aldehyde and heat treatment that the vessel in which the eggs are treated be preferably not subject to local overheating. If high pressure steam is used in a jacketed kettle and the raw eggs come in contact with this over-heated surface a portion of the egg's surface will be preferentially hardened and when that egg is subsequently swollen it will have an irregular shape. While this is desirable in producing a fish bait which will wobble when pulled through the water, it is usually desired to produce a spherical egg, a uniform heat treatment is desired and the eggs are best treated in suspension in hot water.

The temperature of the aldehyde and heat treatment may vary conveniently between about 120° F. and the boiling point of the solution, in which the eggs are suspended. Higher temperatures over the boiling point of the solution at atmospheric pressure may be used. Pressure vessels are required in such instances and the time of heat treatment is shorter at the higher temperature. The time of heat treatment may vary from a few minutes to several hours, at 120° F. At 140° F. the heat treatment usually need not be over 30 minutes but may be longer. The maximum hardening by heat is accomplished within about 30 minutes at the boiling point of saturated brine. Various combinations of aldehyde treatment and heat treatment may be used.

The serum coagulates in white opaque stringy masses and is separated from the eggs and discarded. The eggs after the heat and aldehyde treatment are roughly spherical in shape, having a diameter of about 6 to 9 mm. They are more or less opaque and of a light pink color with a darker pink to red oil spot about 3 mm. in diameter.

These eggs are then washed free of any brine and solution of hardening agent and soaked for a period of time (usually 2 to 24 hours) in an aqueous solution having a pH more acid than 4. After soaking in the acid bath, the eggs are removed and washed thoroughly with fresh water to remove any occluded acid solution. The washed eggs are then soaked in fresh water until they have swollen to the desirable size. The temperature of the fresh water swelling bath has an important bearing on the rate of swelling. Eggs which were 8 mm. in diameter prior to the acid treatment may be swollen to 10.5 mm. in about 6 hours at 70° F. or if immersed in water at 140° F. the soaking time may be shortened to 5 or 10 minutes. In general, a higher temperature shortens the required swelling time, and time and temperature are interchangeable. A short time at a high temperature provides an equivalent effect as a longer time at a low temperature. It will be obvious to anyone skilled in the art that a wide selection of operating conditions may be employed.

Where the egg protein has been only incompletely hardened by heat treatment during the aldehyde and heat treatment it may be further hardened during the swelling at elevated temperature. It is an important part of my invention that the swelling of the egg does not interfere with the thermal hardening of the egg protein. Where swelling is done at elevated temperature a simultaneous swelling and hardening occurs. This is important because it is now possible to swell the fish egg and then harden it by the action of heat at an elevated temperature. Any time sequence may be used in combining the aldehyde heat treatment, swelling, and final heat treatment. Coloring or dyeing may also be accomplished at any stage from the original egg to the final swollen and hardened egg.

A wide variety of acids may be used for the acid bath, and the term "acid" as used herein is to be construed as including any of the following. The acid used may be any inorganic acid or organic acid, capable of giving a water solution having a pH below 5.0. The following acids are satisfactory: hydrofluoric acid, hydrochloric acid, hydrobromic acid, sulfuric acid, phosphoric acid, alky phosphoric acids, acetic acid, propionic acid, oxalic acid, lactic acid, citric acid, benzoic acid, maleic acid, phthalic acid, and other similar acids. Certain acid salts or compounds which hydrolyze to give acids or react to give acids, or an acid pH, may be used. These materials may be inorganic or organic in composition. Chemical reactions which generate acids may be used.

After the eggs are swollen and hardened they are drained free of liquid, packed in suitable containers and hermetically sealed. Under these conditions of packing the swollen egg does not change appreciably in size during storage under hermetically sealed condition. If these eggs are immersed in saturated sodium chloride solution at room temperatures, the swollen eggs will decrease in size, ultimately returning nearly to the small original size. If the eggs are immersed in fresh water they will gradually swell becoming softer. This may take several weeks or more. The swollen egg will not change in size if it is immersed in a solution which has the same tendency for liquid to osmose into the cell, through the cell wall as the cell fluid has to osmose through the cell wall into the solution. This is known as an iso-tonic solution. When the swollen and hardened eggs are drained and packed in hermetically sealed containers the small amount of solution which was last present on the surface of the egg at the time of packing soon becomes isotonic in character. The packed eggs are in osmotic equilibrium with the small amount of solution from which they were not completely drained.

*Example I*

50# of salmon eggs having a diameter approximately 6.9 mm. and a pH of 6.5 obtained from a commercial catch of *Onchorynchus keta* were treated with 15% by weight sodium chloride solution drained and stored in solid pack in kegs for two weeks. The eggs were placed in 30 gal. of 15% sodium chloride solution containing 3 ounces of commercial 37% formaldehyde solution and heated in a Monel kettle to 140° F. for about 15 minutes. After this heat and formaldehyde treatment the eggs were drained and washed thoroughly with fresh water by slurrying the eggs six times in 250# of fresh tap water at 55° F. The eggs were then transferred to a wooden barrel and immersed in 250# of a solution containing 2.12# of technical grade hydrochloric acid having a specific gravity at 60° F. of 1.189. After 16 hours immersion at 70° F. in this acid solution (the pH of the solution containing the eggs was pH 1), the eggs were removed and washed 6 times with successive 250# lots of fresh tap water. 25# of the eggs were then transferred to a fluorescent dye solution containing 0.1# eosin and 0.001# tri-methyl-benzyl ammonium chloride and held at 140° F. for about 20 minutes, until the eggs had swollen to about 10 to 10.5 mm. in diameter and had been dyed a uniform red color. The pH of the interior of the egg not including the oil sac was pH 4.8. The eggs were then packed into 2 oz. glass jars for storage and shipment to fishing tackle outlets. These eggs were swollen to 370% of the original volume.

The other 25# of eggs were allowed to soak in a fluorescent dye solution containing 0.1# eosin and 0.001# tri-methyl-benzyl ammonium chloride dissolved in 100# of tap water at 70° F. for 6 hours. The average diameter of the eggs was 10 to 10.5 mm. The skins were firmly attached to the inside of the egg and the consistency of the whole egg was similar to that of a weak art gum eraser and harder than the original raw egg. The eggs were colored a deep fluorescent pink by the dye. Any suitable fluorescent or other dye may be used, however experience has shown that shades of red and yellow are most effective. The tri-methyl-benzyl ammonium chloride is used to prevent mold and bacterial growth in the finished product. Obviously any other combination of a bactericide and fungicide may be used.

*Example II*

50# of salmon eggs obtained from a commercial catch of *Onchorynchus tsawytscha* were stored for 24 hours in 15% by weight sodium chloride solution. The eggs were placed in 30 gal. of 15% sodium chloride solution containing 3.5 ounces of commercial 36% formaldehyde solution and heated in a Monel kettle to 145° F. for about 10 minutes. After this initial heat and formaldehyde treatment the eggs were drained and washed thoroughly with fresh water by slurrying the eggs 10 times in 250# of fresh tap water at 58° F. The eggs were then transferred to a wooden barrel and immersed in 250# of a solution containing 10# of glacial acetic acid. After 16 hours' immersion at 70° F. in this acid solution (pH 3) the eggs were removed and washed continuously for 2½ hours. At the end of this wash period the eggs were swollen to between 8.5–9 mm. (200% of the original volume), and were sufficiently firm to withstand from 2 to 4 casts. The skins were firmly attached to the interior of the egg. The eggs were spherical and the oil sac was not distorted. 25# of these swollen eggs were immersed for 3 minutes in water having a temperature of 180° F. This additional heat treatment caused additional hardening of the egg and simultaneously caused the eggs to swell slightly, increasing their diameter to from 9 to 10.5 mm. The eggs had a pH of 5. These eggs were then dyed for 1 minute in a 0.01% by weight solution of a fluorescent dye known as azo-eosin held at 140° F. After being colored the eggs were drained and packed in hermetically sealed glass jars. These eggs were quite stable and made attractive bait for trout.

The other 25# of swollen eggs were immersed for 5 minutes in water at 150° F., drained and immersed in a white mineral oil (obtained from the Shell Oil Company and known as Ondina #133) containing 5% by weight of Shannon-Glow Phosphorescent Color #83, and 5% by weight of herring oil. These eggs were activated by ordinary light and continued to glow with a flesh like color in the absence of incident light due to the phosphorescent nature of the pigments in the Shannon-Glow Phosphorescent color. The eggs had the odor of herring oil which added to the attractiveness of the bait. The Shannon-Glow Phosphorescent color was obtained from the Shannon Luminous Materials Co., 7354 Santa Monica Blvd., Hollywood 46, California.

*Example III*

50# of the eggs of Example 1 which had been stored for 2 weeks after the 15% sodium chloride treatment were placed in 30 gallons of water containing 1% aluminum sulfate and heat treated at 160° F. for 20 minutes. After this treatment the eggs were removed, cooled to 80° F. and immersed in 250# of water containing 2.5# of 100% sulfuric acid for 24 hours. At the end of this time the eggs were washed in running tap water, approximately 2 hours, until they had swollen to a diameter of 9.5 mm. The eggs were firm and hung well on a No. 8 fish hook and had a pH of 4.0.

*Example IV*

50# of the eggs of Example 1 which had been stored for two weeks after the 15% sodium chloride treatment were placed in 30 gallons of 15% sodium chloride solution containing 5 ounces of benzaldehyde and boiled for 10 minutes. After this treatment the eggs were removed, washed free of brine, cooled to 75° F. and immersed in 250# of water containing 10# of citric acid for 24 hours. At the end of this time the eggs were washed in running tap water approximately 6 hours until they had attained a diameter of 9.2 mm., and they then had a pH of 4.5. These eggs were then drained and packed in 8 ounce jars.

While the main use for acid swollen and hardened fish eggs is for fish bait, the swollen eggs may be used for other purposes such as ornamentation, as an elastic center for golf balls, and other uses. Enlarged fish eggs not treated with preservatives or harmful chemicals other than non-harmful acids may be used for food purposes.

This application is a continuation of my copending application Serial No. 467,897, filed November 9, 1954, entitled "Improved Fish Bait," which application is now abandoned.

I claim:
1. A process for swelling fish eggs comprising the steps of soaking the eggs in an acid solution followed by soaking in water until swollen.
2. Fish eggs, enlarged by the process of claim 1.
3. A process for swelling fish eggs and preserving them in the swollen state consisting of soaking the eggs in an acid solution followed by soaking in water until swollen, removing the swollen eggs from the water and storing same in a hermetically sealed container.
4. Fish eggs, enlarged and hermetically sealed by the process of claim 3.
5. A process for swelling, coloring and preserving fish eggs which consists of the steps of soaking the eggs in a solution containing an acid and a fluorescent dye, followed by soaking in water until swollen to at least 125% of the original egg volume.
6. Fish eggs enlarged and colored by the process of claim 5.
7. A process for making fish bait which consists in partially hardening fish eggs by treatment with a small amount of an aldehyde and a heat treatment, further hardening by soaking in an acid solution and enlarging and hardening further by heating in water at an elevated temperature.
8. A process for enlarging fish eggs comprising the steps of separating the egg skeins from the fish, treating the egg skeins with a protein hardening agent in salt solution, heating until the serum coagulates in opaque stringy masses and simultaneously hardening the eggs, separating the eggs from the coagulated serum, washing the eggs free of brine and protein hardening agent, soaking the eggs in an acid aqueous solution, washing the eggs with fresh water to remove any occluded acid solution, and immersing the eggs in fresh water to increase the water content of the eggs and increasing the average diameter of the eggs in comparison to natural eggs, removing the eggs from the swelling bath and hermetically sealing the eggs in a container.
9. A process for enlarging fish eggs comprising the steps of separating the egg skeins from the fish, treating the egg skeins with a protein hardening agent in salt solution, heating until the serum coagulates in opaque stringy masses and simultaneously hardening the eggs, separating the eggs from the coagulated serum, washing the eggs free of brine and protein hardening agent, soaking the eggs in an acid aqueous solution, washing the eggs with fresh water to remove any occluded acid solution, and immersing the eggs in fresh water to increase the water content of the eggs and increasing the average diameter of the eggs in comparison to natural eggs, removing the eggs from the swelling bath, treating the eggs with a preservative solution and hermetically sealing the eggs in a container.
10. A process for enlarging fish eggs comprising the steps of separating the egg skeins from the fish, treating the egg skeins with a protein hardening agent in salt solution, heating until the serum coagulates in opaque stringy masses and simultaneously hardening the eggs, separating the eggs from the coagulated serum, washing the eggs free of brine and protein hardening agent, soaking the eggs in acid aqueous solution, washing the eggs with fresh water to remove any occluded acid solution, and immersing the eggs in fresh water to increase the water content of the eggs and increasing the average diameter of the eggs in comparison to natural eggs, removing the eggs from the swelling bath, treating the eggs with a preservative solution at elevated temperature to additionally preserve and harden the eggs, and hermetically sealing the eggs in a container.

11. A process for enlarging fish eggs comprising the steps of separating the egg skeins from the fish, treating the egg skeins with a protein hardening agent in salt solution, heating until the serum coagulates in opaque stringy masses and simultaneously hardening the eggs, separating the eggs from the coagulated serum, washing the eggs free of brine and protein hardening agent, soaking the eggs in an acid aqueous solution, washing the eggs with fresh water to remove any occluded acid solution, and immersing the eggs in fresh water to increase the water content of the eggs and increasing the average diameter of the eggs in comparison to natural eggs, removing the eggs from the swelling bath, treating the eggs with a combined preservative and dye solution at elevated temperature to simultaneously preserve, dye and additionally harden the eggs, and hermetically sealing the eggs in a container.

12. A process for enlarging fish eggs comprising the steps of separating the eggs skeins from the fish, treating the egg skeins with a protein hardening agent in salt solution, heating until the serum coagulates in opaque stringy masses and simultaneously hardening the eggs, separating the eggs from the coagulated serum, washing the eggs free of brine and protein hardening agent, soaking the eggs in an acid aqueous solution, washing the eggs with fresh water to remove any occluded acid solution, and immersing the eggs in fresh water to increase the water content of the eggs and increasing the average diameter of the eggs in comparison to natural eggs, removing the eggs from the swelling bath, treating the eggs with a combined preservative and dye solution at elevated temperature to simultaneously preserve, dye and additionally harden the eggs, and hermetically sealing the eggs in a container.

13. A process for swelling fish eggs comprising the steps of soaking the eggs in a solution containing an acid capable of giving a solution having a pH below about 5.0 followed by soaking in water until swollen.

14. Fish eggs, enlarged by the process of claim 13.

15. A process for swelling fish eggs comprising the steps of heating fish eggs in a saline solution containing a protein hardening agent, removing the eggs from the saline solution, soaking the eggs in a solution having a pH below about 5.0, removing the eggs and soaking the eggs in water until swollen.

16. Fish eggs, enlarged by the process of claim 15.

17. A process for swelling and preserving fish eggs comprising the steps of heating fish eggs in a saline solution containing a protein hardening agent, removing the eggs from the saline solution, soaking the eggs in a solution having a pH below about 5.0, removing the eggs, swelling the eggs in water, treating the eggs with a preservative and hermetically sealing the eggs in a container.

18. Fish eggs, enlarged, hermetically sealed and preserved by the process of claim 17.

19. A process for making fish bait which comprises immersing salmon eggs in sodium chloride solution more concentrated than 15% and containing from between 0.5 and 30 ounces of 37% formaldehyde solution per 100 gallons of brine, heating the eggs and brine solution to a temperature between 120° F. and the boiling point of the solution for a period of time from 10 minutes to two hours, draining and washing the eggs free of brine, immersing the eggs in an aqueous solution having a pH more acid than about 4.0 for a period of time between 2 and 24 hours, draining and washing the eggs free of acidic solution, and soaking the eggs in fresh water having a temperature between 70° F. and 180° F. for a period of time between 3 minutes to 24 hours to increase their water content and until a volume change takes place rendering the eggs at least about 125% their original volume.

References Cited in the file of this patent

UNITED STATES PATENTS

| | | |
|---|---|---|
| 1,703,324 | Sellers | Feb. 26, 1929 |

FOREIGN PATENTS

| | | |
|---|---|---|
| 741,246 | France | 1933 |

OTHER REFERENCES

Fishery Leaflet 28, U.S. Dept. of Interior, September 1946, pp. 17 and 18.